United States Patent [19]
Oganesoff et al.

[11] Patent Number: 5,942,270
[45] Date of Patent: Aug. 24, 1999

[54] PROCESS OF PRESERVING THE GREEN COLOR OF GREEN BEANS

[75] Inventors: Veronique Oganesoff, Paris, France; Dharam Vir Vadehra, New Milford, Conn.

[73] Assignee: Nestec S.A., Vevey, Switzerland

[21] Appl. No.: 09/037,241

[22] Filed: Mar. 9, 1998

[51] Int. Cl.$^6$ ..................................... A23B 7/153
[52] U.S. Cl. .................. 426/262; 426/268; 426/270; 426/310; 426/321; 426/327; 426/331; 426/615; 426/629; 426/654; 426/442; 426/507
[58] Field of Search .................... 426/262, 268, 426/270, 310, 321, 327, 331, 615, 629, 654, 442, 507, 508, 518, 519

[56] References Cited

U.S. PATENT DOCUMENTS

| | | | |
|---|---|---|---|
| 1,908,795 | 5/1933 | Sharma | 426/270 |
| 2,133,117 | 10/1938 | Schroder | 426/270 |
| 2,186,003 | 1/1940 | Blair | 426/270 X |
| 2,189,774 | 2/1940 | Blair | 426/270 |
| 2,875,071 | 2/1959 | Malecki | 426/270 X |
| 2,906,628 | 9/1959 | Malecki | 426/270 X |
| 4,478,860 | 10/1984 | Hekal et al. | 426/270 X |
| 4,615,924 | 10/1986 | Hekal et al. | 426/270 X |
| 4,701,330 | 10/1987 | Rogers et al. | 426/270 |
| 4,810,512 | 3/1989 | Kratky et al. | 426/270 |
| 4,832,969 | 5/1989 | Lioutas | 426/270 |
| 4,959,230 | 9/1990 | Wyss et al. | 426/270 X |

*Primary Examiner*—Milton Cano
*Attorney, Agent, or Firm*—Pennie & Edmonds LLP

[57] ABSTRACT

A process for preserving the green color of green beans which comprises contacting frozen green beans with a mixture consisting essentially of a food acceptable alkaline material and ascorbic acid.

16 Claims, No Drawings

PROCESS OF PRESERVING THE GREEN COLOR OF GREEN BEANS

FIELD OF THE INVENTION

The present invention relates to a method for the color preservation of green beans more particularly refrigerated green beans which may have previously been retorted and frozen.

BACKGROUND OF THE INVENTION

For use in a refrigerated dish, green beans are harvested, cut, blanched, individually quick frozen, optionally mixed with other ingredients such as rice, chicken, an acid sauce is added and the dish is retorted, frozen, and finally thawed for storage in the refrigerated condition. The problem is that, after a few days of refrigeration, the green color of the beans starts to turn olive.

SUMMARY OF THE INVENTION

We have devised a method of maintaining the green color of green beans throughout at least 8 days of refrigerated storage by treating the frozen green beans with a food acceptable alkaline material and ascorbic acid.

Accordingly, the present invention provides a process for preserving the green color of green beans which comprises treating frozen green beans with a food acceptable alkaline material and ascorbic acid.

DETAILED DESCRIPTION OF THE PREFERRED EMBODIMENTS

Any type of green bean may be treated by the process of this invention, e.g. whole, cut, short cut, mixed or French style, especially French cut beans. After harvesting, the green beans may be, if desired, cut, blanched and individually quick frozen. The blanching may be performed by regular blanching or by vacuum blanching. Vacuum blanching enhances the green color.

Any food acceptable alkaline material may be used in the process, but most conveniently a carbonate, bicarconate or hydroxide, preferably sodium bicarbonate or sodium hydroxide are used.

One method of treatment is by soaking the frozen green beans in a solution of the food acceptable alkaline material and ascorbic acid. The solution is conveniently an aqueous solution. The concentration of the food acceptable alkaline material in the solution may be from 0.3 to 1.5%, preferably from 0.5 to 1.4% and more preferably from 1.0 to 1.3% by weight. The concentration of the ascorbic acid thereof may be from 0.1 to 0.5%, preferably from 0.2 to 0.4% and more preferably from 0.25 to 0.35% by weight. The pH of the solution may be from 6 to 8, preferably from 6.5 to 7.7, and more preferably from 7.0 to 7.4. The duration of the soaking may conveniently be from 8 minutes to 24 hours, preferably from 8 to 20 hours.

In the preparation of a refrigerated prepared dish, the above treated frozen beans are mixed with the other ingredients such as rice, a meat product such as chicken, beef, pork, lamb, or fish, and an acid sauce, e.g. a glazed sauce. The dish is then retorted and then frozen, and later thawed and refrigerated. It is usually distributed frozen and thawed by the retailer who sells the product refrigerated within about 8 days.

Another method of treating the frozen green beans, when the frozen green beans are to be mixed with other ingredients of a refrigerated prepared dish such as rice, meat, e.g. chicken, lamb, beef or fish, and an acid sauce or a coating, comprises adding the alkaline material and ascorbic acid to the sauce or the coating. The concentration of the food acceptable alkaline material in the sauce may be from 0.3 to 1.5%, preferably from 0.5 to 1.4% and more preferably from 1.0 to 1.3% by weight. The concentration of the ascorbic acid may be from 0.1 to 0.5%, preferably from 0.2 to 0.4% and more preferably from 0.25 to 0.35% by weight. The pH of the sauce after addition of treatment materials may be from 6 to 8, preferably from 6.5 to 7.7, and more preferably from 6.8 to 7.5.

In the preparation of a refrigerated prepared dish, the sauce or the coating is advantageously mixed with the frozen beans first and the mixture of sauce or coating with beans is then added to the other ingredients, for instance in a tray, and covered with an acid sauce, e.g. a glazed sauce.

The dish is retorted and frozen, then thawed and refrigerated, usually by the retailer who sells the product refrigerated within about 8 days.

The treatment process of the present invention may be used in any freeze-thaw dish and even in any refrigerated dish where green color degradation is an issue under prolonged refrigeration.

The present invention enables the beans to retain their bright green color over a period of at least 8 days refrigeration.

EXAMPLES

The following Examples further illustrate the present invention.

Example 1

French green beans are harvested, cut, blanched at 190° F. (90° C.) for 2.5 minutes and then individually quick-frozen. The frozen beans are pretreated by soaking for 18 hours in an aqueous solution containing 0.3% ascorbic acid and 1.2% sodium bicarbonate having a pH of 7.2. The beans are separated from the soaking solution. A single serve dish is prepared by mixing the pretreated frozen beans with a rice mix consisting of onions, carrots, green beans and a coating sauce containing spices, onions, starch and pectin (pH 7.27). This is placed in a tray with marinated chicken together with a glaze sauce (pH 4.5) and then retorted and frozen.

The dish is later thawed and refrigerated. The beans retained their bright attractive green color for 8 days.

Example 2

A similar procedure to that described in Example 1 is followed except that the beans are blanched under a vacuum of 25 inches (635 mm) of Hg. The beans retained their bright attractive green color after 8 days of refrigeration.

Example 3

French green beans are harvested, cut, blanched at 190° F. (90° C.) for 2.5 minutes and then individually quick-frozen. To a sauce containing a mixture of spices, onions, starch and pectin having a pH of 7.27 is added 0.3% by weight ascorbic acid and 1.2% by weight sodium bicarbonate. This coating sauce is first mixed with the frozen green beans to which are added the rice, carrots and onions to give rice mix. It is then placed in a tray with marinated chicken tenders covered with a glazed sauce (pH=4.5), retorting (P85=0.1) and freezing.

The dish is later thawed and refrigerated. The beans retained their bright attractive green color for 8 days.

What is claimed is:

1. A process for preserving the green color of green beans comprising the steps of contacting frozen green beans with a mixture consisting essentially of a food acceptable alkaline material and ascorbic acid, wherein the mixture contains sufficient amounts of the alkaline material and ascorbic acid and contacts the beans for a time sufficient to maintain the green color of the beans during refrigerated storage.

2. The process according to claim 1 wherein after harvesting, the green beans are cut, blanched and individually quick frozen.

3. The process according to claim 2 wherein the blanching is performed by regular blanching or by vacuum blanching.

4. The process according to claim 1 wherein the food acceptable alkaline material is sodium bicarbonate or sodium hydroxide.

5. The process according to claim 1 wherein the beans are treated by soaking the frozen green beans in a solution containing the food acceptable alkaline material and ascorbic acid.

6. The process according to claim 5 wherein the concentration of the food acceptable alkaline material in the solution is from 0.3 to 1.5% by weight.

7. The process for the preparation of a refrigerated prepared dish in which frozen green beans treated with a solution in accordance with the process of claim 6 are mixed with rice, meat and an acid sauce, retorted and then frozen, thawed and refrigerated.

8. The process according to claim 5 wherein the concentration of the ascorbic acid in the solution is from 0.1 to 0.5% by weight.

9. The process according to claim 5 wherein the pH of the solution is from 6 to 8.

10. The process according to claim 5 wherein the duration of the soaking in the solution is from 8 minutes to 24 hours.

11. A process of preserving green color of frozen green beans in the preparation of a refrigerated prepared dish comprising the steps of:

adding a food acceptable mixture comprising an alkaline material and ascorbic acid to a sauce or coating;

mixing the sauce or coating containing the mixture with frozen green beans; and adding the mixture of sauce or coating with the green beans to ingredients of a refrigerated prepared dish;

wherein the alkaline material and ascorbic acid are present in combination in an amount sufficient to maintain the green color of the beans during refrigerated storage.

12. The process according to claim 11 wherein the concentration of the food acceptable alkaline material in the sauce or coating is from 0.3 to 1.5% by weight.

13. The process according to claim 11 wherein the concentration of the ascorbic acid in the sauce or coating is from 0.1 to 0.5% by weight.

14. The process according to claim 11 wherein the pH of the sauce or coating is from 6 to 8.

15. The process according to claim 11 wherein the ingredients are at least one selected from the group consisting of rice, chicken, fish, and meat.

16. The process according to claim 11 wherein the food acceptable alkaline material is sodium bicarbonate and sodium hydroxide.

* * * * *